Patented Sept. 11, 1934

1,973,649

UNITED STATES PATENT OFFICE 1,973,649

SANDING SEALER

Walter Nebel, Parlin, N. J., assignor to E. I. du Pont de Nemours & Company, Wilmington, Del., a corporation of Delaware No Drawing. Application March 25, 1930, Serial No. 438,895

4 Claims. (Cl. 134—26)

This invention relates to compositions known as sanding sealers, which are applied to rough surfaces and are smoothed by rubbing with sand paper in order that the subsequently applied top coat may lie upon a smooth surface and require a minimum of polishing.

The invention will be described in connection with the art of finishing wooden objects, such as furniture, although it is equally applicable to surfaces, of whatever kind, upon which the use of a sanding sealer is beneficial.

In applying rapidly drying pyroxylin lacquers to wooden furniture it has been common practice to apply, after the stain and filler, a light first coat of so-called sealer. This sealer is so called because it seals the fibres of the wood so that when this coat is sand papered any wood fibres which project into the lacquer will be cut off and the whole levelled down to a smooth surface.

The properties which are desirable in a sanding sealer are that it shall cut down easily to a smooth surface which will not roll, which will not clog the sand paper, which will be durable, and which will dry quickly. A commonly used sealer is shellac, which dries quickly and sands with fair ease, but which when applied beneath a pyroxylin top coat provides a system of inferior durability. One reason for this lack of durability is that upon drying the shellac becomes practicably insoluble in the solvents of the subsequently applied lacquer coating which results in poor adhesion between the sealer and the lacquer coat. The consequence of this poor adhesion is chipping of the lacquer.

Various attempts have been made to produce a sealer of the lacquer type having the easy sanding and rapid drying characteristics of shellac but which would allow the formation of a close bond between the sealer and the top coat. These sealers have almost invariably been composed of cellulose nitrate and a natural resin. However, due to the fact that the sanding qualities of these lacquers are seriously impaired if the ratio of pyroxylin to the natural resins exceeds one part of pyroxylin to one-half part of resin, these sealers have been undesirably low in solids. Furthermore, the use of plasticizers in these compositions is necessary to secure sufficient durability, and their use injures the rubbing characteristics of the sealer. Another bad feature of the prior art lacquer sealers is that they are rather highly soluble in the solvents of the top coat, dissolve therein to a considerable extent, and cause an objectionable sinking of the system whereby it assumes the contour of the wood. As a consequence of these and certain other poor qualities, lacquer sealers have heretofore been unsatisfactory.

An object of this invention is to produce a sealer of the cellulose derivative type having easy sanding characteristics, high build, and excellent durability. Another object of the invention is the production of a sealer which will adhere firmly to the protected surface, which will dry quickly, which will form a close bond with the top coat, and which will have none of the disadvantages of prior art sealers.

These objects are accomplished by incorporating with a cellulose derivative solution a synthetic resin comprising an ester of a polyhydric alcohol with a polybasic acid, an ester of a polyhydric alcohol with a fatty acid of the saturated series having more than eight carbon atoms, and an ester of a polyhydric alcohol with rosin acids.

These resins of the polyhydric alcohol-polybasic acid type, which may be made in the various ways set forth in the literature for the production of soluble products well understood by those skilled in the art, contain in combined form a polyhydric alcohol, a polybasic acid and suitable modifying agents to make the resin soluble and to modify the film forming characteristics of the resin, the modifying agents in the present instance being the rosin acids and the fatty acids mentioned.

I prefer to use zinc stearate as the sanding promoter with these resins in my new sanding sealer. It will be understood, however, that other agents known in the trade as sanding promoters may be used.

It will be observed that in this resin, whose incorporation with the sanding promoter into the cellulose derivative solution makes possible my invention, there are three variables, each of which I have considered in order that I might determine the proportions which yield the most desirable results.

I have discovered that the presence of an ester of a polyhydric alcohol with a polybasic acid, such as glyceryl phthalate, produces a resin which, in the combination mentioned above, yields a quick drying, hard, tough film. I have discovered, however, that if the proportions of glyceryl phthalate are increased above about 65% by weight of the resin the viscosity becomes so high that there is danger that the resin will gel, will be incompatible with pyroxylin, and will be relatively insoluble in lacquer solvents.

I have discovered that the presence in the resin of an ester of a suitable higher fatty acid, such as stearic glyceride, improves the durability of the composition and promotes good sanding and rubbing qualities. These, however, when used in proportions above about 40% of the weight of the resin tend to impair the adhesion of the top coat to the sealer, to give a softer lacquer, and to promote lacquer bloom, which consists in the appearance on the surface of the dried lacquer of a white excrescence of uncombined stearic acid.

The presence of an ester of a polyhydric alcohol with a rosin acid, such as rosin glyceride, lowers the viscosity of the resin, makes it more compatible with pyroxylin, more soluble in lacquer solvents, and promotes easy sanding. This low viscosity permits the formulation of a sealer solution having a very high solids content (high build) at spraying viscosities. These desirable qualities appear to increase in proportion with the amount of rosin glyceride used up to about 60% by weight. If more than about that amount is present, the sealer exhibits a tendency to dry more slowly and, when dried, produces a film of less desirable durability having a tendency to soften in the sanding operation and plug the sand paper.

Generally speaking, I obtain preferred results if the resin contains between 20 and 65% of polyhydric-alcohol-polybasic acid ester, between 5 and 40% of polyhydric alcohol-higher fatty acid ester, and between 10 and 60% of a polyhydric alcohol-rosin acid ester.

In making up the sealer using this resin, nitrocellulose and the resin will be dissolved in any of the solvents which are commonly used in lacquer formulation and which will produce compositions of good compatibility, flow, and blush resistance. In general, if 10 parts of nitrocellulose are used preferred results will be obtained by using therewith between about 5 and 20 parts of resin. With this mixture is incorporated a sanding promoter, such as zinc stearate, calcium stearate, or a wax such as carnauba. In a composition containing 10 parts of nitrocellulose and between 5 and 20 parts of resin preferred results are obtained by using between about .2 part and about 2.5 parts of sanding promoter.

Other metallic stearates, such as aluminum stearate can be used as sanding promoters, but I have noticed that aluminum stearate, when used in quantities great enough to promote sanding, gives a turbid or milky film which has a satiny sheen and the appearance of having been rubbed. This turbidity obscures the grain of the wood and renders the use of aluminum stearate rather unsatisfactory in wood finishing.

Any cellulose derivative which is useful in lacquers may be used in my invention, but preferred results are obtained with cellulose nitrate, particularly with cellulose nitrate having viscosity between about 30 and 1200 centipoises in a 16 oz. solution in CP ethyl acetate measured in the Stormer viscometer at 28° C. Cellulose acetate, if used, can be used only with small quantities of resin, and only in the presence of small quantities of cellulose nitrate.

Dyes or pigments may be used in my composition in such quantities as will produce a suitable color effect.

Flatting agents, so called, such as aluminum stearate, hydrated alumina, silex, can be used in addition to the sanding promoter to produce a satiny surface which is, however, not generally desirable when the sealer is applied to wood.

Examples of resins which have given satisfactory results are as follows, the compositions being given as parts by weight:—

*Example I*

| | |
|---|---|
| Phthalic glyceride | 38 |
| Stearic glyceride | 34 |
| Rosin glyceride | 28 |
| | 100 |

This resin contains in combined form 17.0 parts by weight of glycerol, 27.5 parts by weight of phthalic anhydride, 30.3 parts by weight of stearic acid and 25.2 parts by weight of rosin.

*Example II*

| | |
|---|---|
| Phthalic glyceride | 37 |
| Stearic glyceride | 28 |
| Rosin glyceride | 35 |
| | 100 |

This resin contains in combined form 16.6 parts by weight of glycerol, 26.7 parts by weight of phthalic anhydride, 25.1 parts by weight of stearic acid and 31.6 parts by weight of rosin.

*Example III*

| | |
|---|---|
| Phthalic glyceride | 35 |
| Palmitic glyceride | 20 |
| Rosin glyceride | 45 |
| | 100 |

This resin contains in combined form 16.2 parts by weight of glycerol, 25.3 parts by weight of phthalic anhydride, 17.8 parts by weight of palmitic acid, and 40.7 parts by weight of rosin.

*Example IV*

| | |
|---|---|
| Phthalic glyceride | 35 |
| Lauric glyceride | 20 |
| Rosin glyceride | 45 |
| | 100 |

This resin contains in combined form 16.7 parts by weight of glycerol, 25.2 parts by weight of phthalic anhydride, 17.5 parts by weight of lauric acid and 40.6 parts by weight of rosin.

Any of these resins when used in a sealer gives excellent results, but I prefer Examples I and II over the other examples. An example of a sealer made up with these resins is as follows:

*Example V*

| | Per cent |
|---|---|
| Low viscosity nitrocellulose | 9.6 |
| Resin of Example I, II, III, or IV | 14.4 |
| Zinc stearate | 1.0 |
| Ethyl alcohol | 4.8 |
| Butyl acetate | 8.3 |
| Butyl alcohol | 5.4 |
| Ethyl acetate | 12.3 |
| Xylol | 3.0 |
| Toluol | 41.2 |
| | 100.0 |

An advantage of my invention is the production of new compositions of matter which produce improved results in coating compositions of the so-called sealer type. Another advantage of my invention is the production of sanding sealers which completely seal the wood, which have easy sanding characteristics, which adhere well to the surface to which they are applied and to the subsequently applied top coat, which are not penetrated sufficiently by the materials of the top coat to disturb their adhesion to the protected surface, but which are penetrated sufficiently to form a close bond with the top coat, which are smooth and require a minimum of rubbing, which are high in solids content, which are durable, and which are compatible with nitrocellulose.

As many apparently widely different embodiments of this invention may be made without departing from the spirit and scope thereof, it is to be understood that I do not limit myself to the specific embodiments thereof except as defined in the appended claims.

I claim:

1. A sanding sealer comprising nitrocellulose, a sanding promoter, and a fatty and rosin acid modified polyhydric alcohol-polybasic acid resin containing from 20% to 65% polybasic acid ester, from 5% to 40% fatty acid ester, and from 10% to 60% rosin acid ester, said sanding promoter being one of the group consisting of zinc stearate, calcium stearate, and a wax, the sanding promoter, resin and nitrocellulose being present in an amount of from 0.2 to 2.5 parts by weight promoter for each 10 parts of nitrocellulose and 5 to 20 parts resin.

2. A sanding sealer comprising nitrocellulose, a sanding promoter, and a fatty and natural resin acid modified polyhydric alcohol-polybasic acid resin containing from 20% to 65% polybasic acid ester, from 5% to 40% fatty acid ester, and from 10% to 60% natural resin acid ester, said sanding promoter being one of the group consisting of zinc stearate, calcium stearate, and a wax, the sanding promoter, resin and nitrocellulose being present in an amount of from 0.2 to 2.5 parts by weight promoter for each 10 parts of nitrocellulose and 5 to 20 parts resin.

3. The sanding sealer set forth in claim 1 in which the polybasic acid ester is glyceryl phthalate and the fatty acid ester is stearic acid ester.

4. The sanding sealer set forth in claim 2 in which the fatty acid ester is stearic acid ester.

WALTER NEBEL.